(12) United States Patent
Liu et al.

(10) Patent No.: US 11,782,311 B2
(45) Date of Patent: Oct. 10, 2023

(54) DISPLAY DEVICE, BACKLIGHT MODULE, AND METHOD FOR ASSEMBLING BACKLIGHT MODULE

(71) Applicant: AmTRAN Technology Co., Ltd., New Taipei (TW)

(72) Inventors: Chun-Wei Liu, New Taipei (TW); Chen-Han Huang, New Taipei (TW); Chih-Kuei Wang, New Taipei (TW)

(73) Assignee: AmTRAN Technology Co., Ltd., New Taipei (TW)

( * ) Notice: Subject to any disclaimer, the term of this patent is extended or adjusted under 35 U.S.C. 154(b) by 0 days.

(21) Appl. No.: 17/655,994

(22) Filed: Mar. 22, 2022

(65) Prior Publication Data

US 2022/0308398 A1   Sep. 29, 2022

Related U.S. Application Data

(60) Provisional application No. 63/165,166, filed on Mar. 24, 2021.

(30) Foreign Application Priority Data

Nov. 8, 2021 (TW) .................................. 110141573

(51) Int. Cl.
*G02F 1/13357* (2006.01)

(52) U.S. Cl.
CPC .. *G02F 1/133608* (2013.01); *G02F 1/133606* (2013.01)

(58) Field of Classification Search
CPC ................... G02F 1/133608; G02F 1/133606
See application file for complete search history.

(56) References Cited

U.S. PATENT DOCUMENTS

| 2013/0335947 | A1* | 12/2013 | Yu ............... G02F 1/133606 362/97.1 |
| 2015/0338571 | A1* | 11/2015 | Jun ................ G02B 6/0088 362/97.1 |
| 2020/0209687 | A1* | 7/2020 | Yan ............... G02F 1/133308 |

FOREIGN PATENT DOCUMENTS

| CN | 103148459 B | 12/2014 |
| CN | 204477811 U | 7/2015 |
| CN | 215494450 U | * 1/2022 |
| KR | 20060134883 A | * 12/2006 ....... G02F 1/133604 |
| TW | I247173 B | 1/2006 |
| TW | 201626072 A | 7/2016 |
| TW | I589968 B | 7/2017 |
| TW | 201816487 A | 5/2018 |

* cited by examiner

*Primary Examiner* — Kevin Quarterman
(74) *Attorney, Agent, or Firm* — CKC & Partners Co., LLC

(57) ABSTRACT

A backlight module includes a housing, a diffuser plate, an optical film, a holder and a light source. The housing has a groove. The groove is arranged along a periphery of the housing. The diffuser plate is disposed in the housing and has an edge located in the groove. The optical film is disposed on the diffuser plate and has a thru-hole. The holder is disposed in the groove of the housing and includes a holding portion and a hanging portion. The holding portion engages the edge of the diffuser plate. The hanging portion is connected to the holding portion and extends through the thru-hole of the optical film. The light source is disposed in the housing.

16 Claims, 10 Drawing Sheets

DISPLAY DEVICE, BACKLIGHT MODULE, AND METHOD FOR ASSEMBLING BACKLIGHT MODULE

RELATED APPLICATIONS

This application claims priority to U.S. Provisional Application Ser. No. 63/165,166 filed Mar. 24, 2021, and Taiwan Application Serial Number 110141573, filed Nov. 8, 2021, the disclosures of which are incorporated herein by reference in their entireties.

BACKGROUND

Technical Field

The present disclosure relates to a display device, a backlight module, and a method for assembling backlight module.

Description of Related Art

A backlight module typically includes at least one optical film to distribute the light emitted by the light source evenly across the display area. Conventional backlight modules sacrifice the appearance of the backplate in order to incorporate mechanisms for holding the optical film. For example, incorporating mechanisms for holding the optical film might require one or more openings to be formed on the backplate. These conventional approaches may also cause the leakage of light from the backplate. As a result, display devices using these conventional backlight modules are required to add an outer part to improve their appearances, as well as to prevent light leakage.

SUMMARY

In view of the foregoing, one of the objects of the present disclosure is to provide a backlight module that can achieve the fixing of the optical film without making sacrifice in its appearance.

To achieve the objective stated above, in accordance with an embodiment of the present disclosure, a backlight module includes a housing, a diffuser plate, an optical film, a holder and a light source. The housing has a groove. The groove is arranged along a periphery of the housing. The diffuser plate is disposed in the housing, and an edge of the diffuser plate is located in the groove. The optical film is disposed on the diffuser plate and has a thru-hole. The holder is disposed in the groove of the housing and includes a holding portion and a hanging portion. The holding portion engages the edge of the diffuser plate. The hanging portion is connected to the holding portion and extends through the thru-hole of the optical film. The light source is disposed in the housing.

In one or more embodiments of the present disclosure, the holding portion of the holder fixedly clamps the diffuser plate.

In one or more embodiments of the present disclosure, the diffuser plate has a first surface and a second surface opposite to the first surface. The holding portion of the holder includes a first covering portion, a second covering portion and a third covering portion. The first covering portion and the second covering portion contact the first surface and the second surface of the diffuser plate respectively. The third covering portion is connected between the first covering portion and the second covering portion.

In one or more embodiments of the present disclosure, the edge of the diffuser plate has at least one notch, and the holding portion of the holder is disposed in the notch.

In one or more embodiments of the present disclosure, the hanging portion of the holder includes a hook structure. The hook structure is located on an end of the hanging portion away from the holding portion.

In one or more embodiments of the present disclosure, the diffuser plate has a first surface, a second surface and a third surface. The third surface is opposite to the first surface. The second surface is connected between the first surface and the third surface. The holding portion of the holder includes a first covering portion and a second covering portion connected to the first covering portion. The first covering portion and the second covering portion contact the first surface and the second surface of the diffuser plate respectively. The holding portion is spaced apart from the third surface of the diffuser plate.

In one or more embodiments of the present disclosure, the hanging portion of the holder is connected to the first covering portion and extends through the diffuser plate.

In one or more embodiments of the present disclosure, the light source, the diffuser plate and the optical film are arranged in a first direction. The housing includes a platform portion and a sidewall portion. The platform portion is configured to support a display panel. The sidewall portion is connected to the platform portion, and the sidewall portion extends beyond the platform portion in the first direction.

In accordance with an embodiment of the present disclosure, a display device includes the aforementioned backlight module and a display panel. The display panel is disposed on a platform portion of the housing of the backlight module.

In one or more embodiments of the present disclosure, the light source, the diffuser plate and the optical film of the backlight module are arranged in a first direction. The housing further includes a sidewall portion connected to the platform portion. The sidewall portion extends along a periphery of the display panel, and the sidewall portion extends beyond a display surface of the display panel or is flush with the display surface in the first direction.

In accordance with an embodiment of the present disclosure, a method for assembling a backlight module includes: fixedly engaging a holder to an edge of a diffuser plate; placing an optical film over the diffuser plate and fitting the optical film onto a hanging portion of the holder, such that the holder, the diffuser plate and the optical film are combined into a piece; and inserting the combined piece of the holder, the diffuser plate and the optical film into a housing, such that the holder and the edge of the diffuser plate are received in a groove of the housing, wherein the groove is arranged along a periphery of the housing.

In one or more embodiments of the present disclosure, the diffuser plate and the optical film are arranged in a first direction, and the step of inserting the combined piece of the holder, the diffuser plate and the optical film into the housing includes: sliding the combined piece of the holder, the diffuser plate and the optical film along a second direction into the groove, wherein the second direction is substantially perpendicular to the first direction.

In sum, in the backlight module of the present disclosure, the diffuser plate and the optical film are combined by the holder, and the housing of the backlight module is a unitary structure and is formed with a groove. The holder and the edges of the diffuser plate and the optical film can be received in the groove. By this arrangement, the backlight module of the present disclosure can hold the diffuser plate and the optical film in the housing while maintaining the completeness of the appearance of the housing. Adding an outer part to the backlight module to improve its appearance and to prevent light leakage, as in conventional backlight modules, would not be necessary.

BRIEF DESCRIPTION OF THE DRAWINGS

To make the objectives, features, advantages, and embodiments of the present disclosure, including those mentioned above and others, more comprehensible, descriptions of the accompanying drawings are provided as follows.

DETAILED DESCRIPTION

Figure 1:
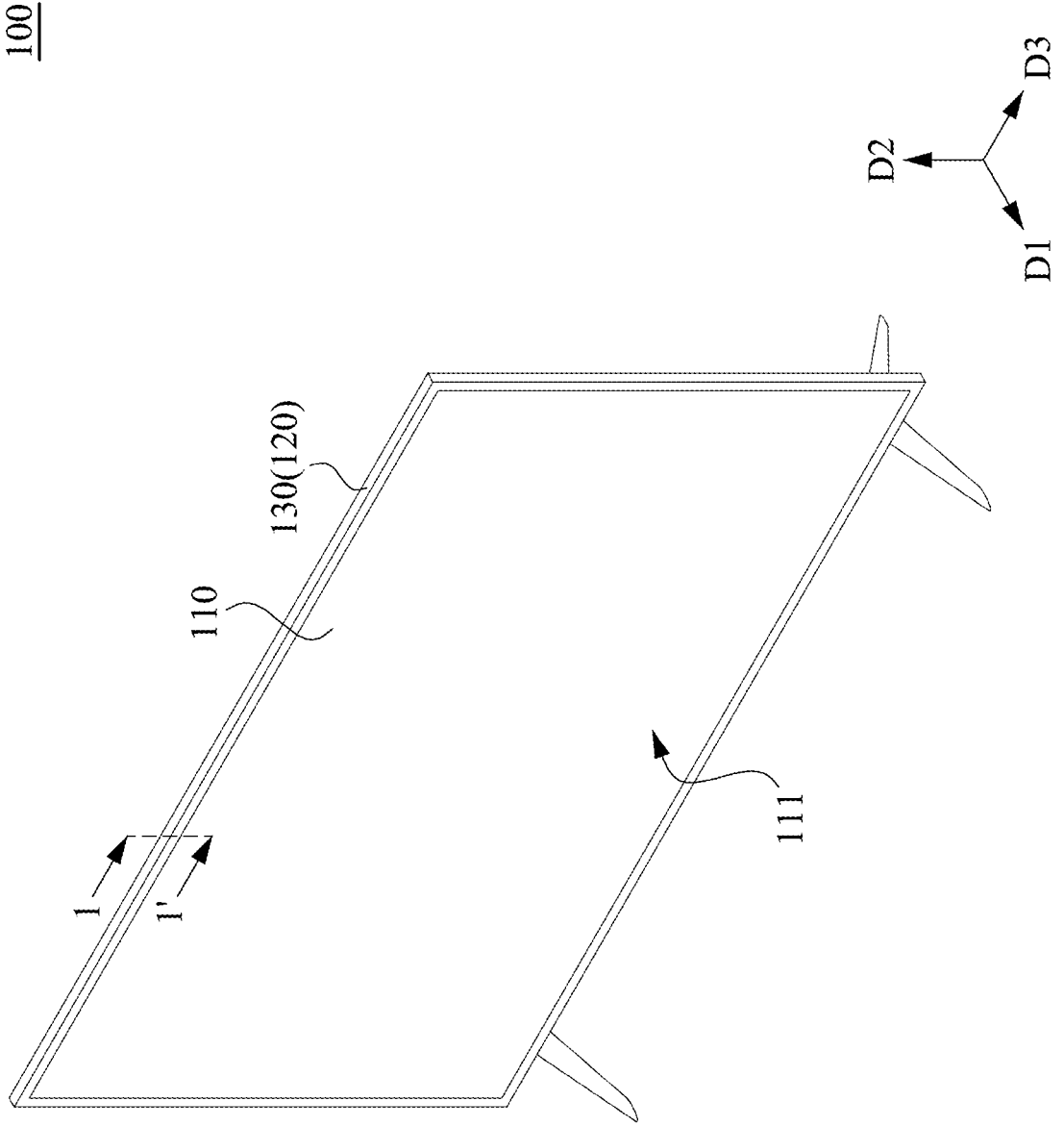
FIG. 1 illustrates a perspective view of a display device in accordance with an embodiment of the present disclosure.

For the completeness of the description of the present disclosure, reference is made to the accompanying drawings and the various embodiments described below. Various features in the drawings are not drawn to scale and are provided for illustration purposes only. To provide full understanding of the present disclosure, various practical details will be explained in the following descriptions. However, a person with an ordinary skill in relevant art should realize that the present disclosure can be implemented without one or more of the practical details. Therefore, the present disclosure is not to be limited by these details.

Reference is made to FIG. 1. A display device 100 includes a display panel 110 (e.g., an LCD panel) and a backlight module 120. The display panel 110 has a first surface 111 and a second surface 112 (depicted in FIG. 2). The second surface 112 is opposite to the first surface 111. The first surface 111 is configured to display a screen. In other words, the first surface 111 is a display surface of the display panel 110. The backlight module 120 includes a housing 130. The display panel 110 is disposed on the housing 130 of the backlight module 120, with the first surface 111 facing away from the backlight module 120. The backlight module 120 is configured to illuminate the display panel 110, such that the display panel 110 can produce a visible image.

As shown in FIG. 1, for the convenience of description, a first direction D1 is defined as the normal direction of the first surface 111 of the display panel 110, a second direction D2 is defined as the direction along which the short sides of the display device 100 extends (e.g., upward direction in FIG. 1), and a third direction D3 is defined as the direction along which the long sides of the display device 100 extends (e.g., horizontal direction in FIG. 1). In some embodiments, the first direction D1, the second direction D2 and the third direction D3 are mutually orthogonal.

Figure 2:
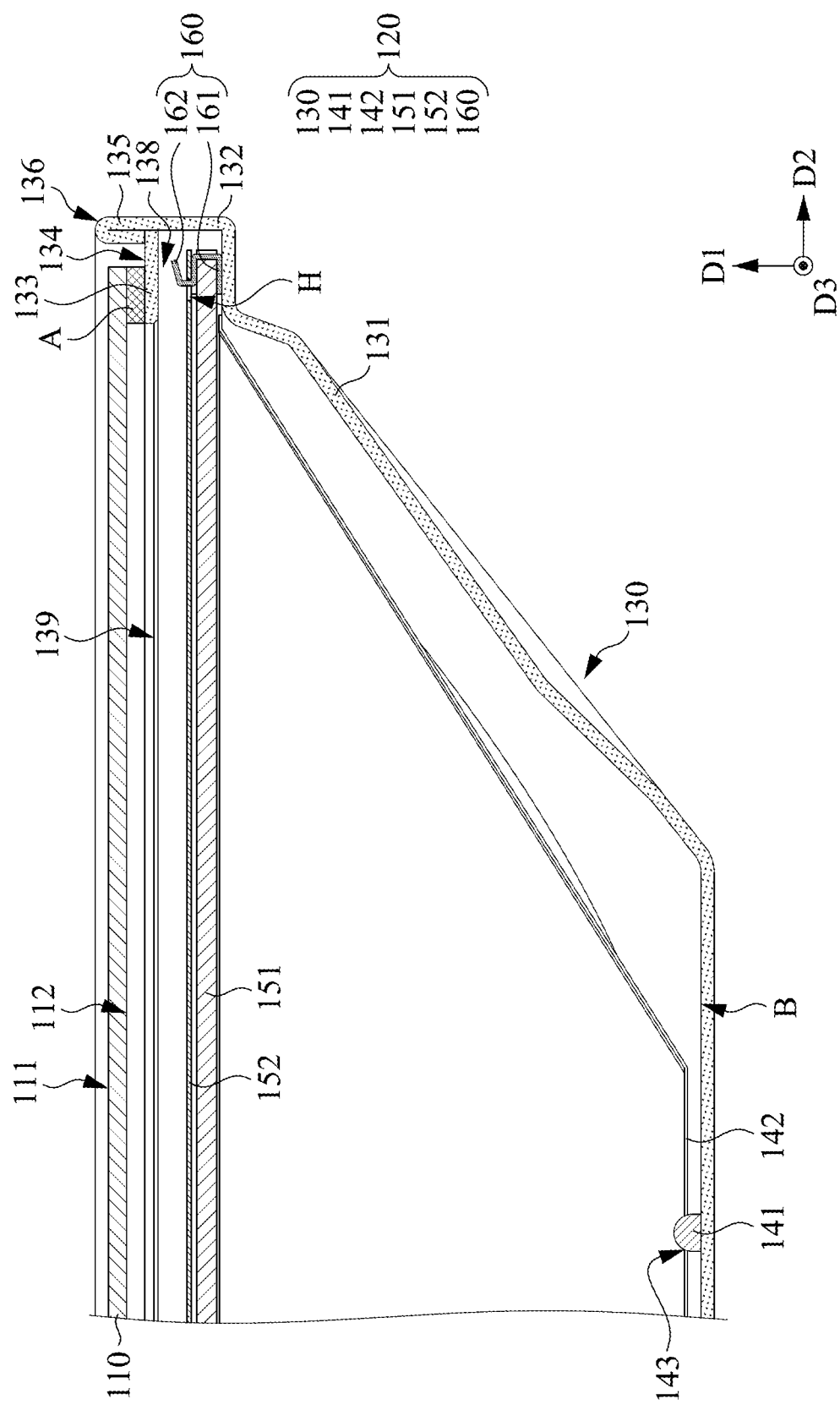
FIG. 2 illustrates an enlarged sectional view of the display device shown in FIG. 1 taken along line segment 1-1'.

Reference is made to FIG. 2. The housing 130 has an opening 139 facing the display panel 110. The backlight module 120 further includes a light source 141 disposed in the housing 130. The light source 141 faces the opening 139 and is oriented towards the first direction D1. As a result, the light source 141 can emit light towards the display panel 110 through the opening 139 of the housing 130. In some embodiments, the light source 141 includes one or more LEDs. In some embodiments, the light source 141 includes one or more LED light strips or LED light boards.

As shown in FIG. 2, in some embodiments, the backlight module 120 further includes a reflector sheet 142. The reflector sheet 142 partially covers an inner surface of the housing 130 and is configured to reflect the light emitted to the inner surface of the housing 130 towards the display panel 110. In some embodiments, the reflector sheet 142 has one or more openings 143, and the light source 141 is disposed in the openings 143 of the reflector sheet 142.

As shown in FIG. 2, in some embodiments, the housing 130 includes a backplate portion 131, a sidewall portion 132 and a platform portion 133. The backplate portion 131 is configured to support the light source 141 and the reflector sheet 142. Specifically, the light source 141 may be disposed on a bottom surface B of the backplate portion 131, and the reflector sheet 142 may cover the bottom surface B and side surfaces of the backplate portion 131. The platform portion 133 is opposite to the backplate portion 131 and is located on at least one side of the opening 139 of the housing 130. The platform portion 133 is configured to support the display panel 110. For example, the display panel 110 may be fixedly attached to a side of the platform portion 133 away from the backplate portion 131 via an adhesive layer A. The sidewall portion 132 is connected to the backplate portion 131 and the platform portion 133. The backplate portion 131, the sidewall portion 132 and the platform portion 133 collectively defines a groove 138. The groove 138 is arranged along a periphery of the housing 130.

In some embodiments, the housing 130 is provided with the sidewall portion 132 and the platform portion 133 on the top, left and right sides, which form the groove 138 with the backplate portion 131 on the top, left and right sides of the housing 130 (i.e., on the top, left and right of the housing 130 when the housing 130 is held upright, as shown in FIG. 1). In some embodiments, the housing 130 is a unitary metallic housing.

As shown in FIG. 2, the backlight module 120 further includes a diffuser plate 151 and at least one optical film 152, both of which are disposed in the housing 130. The light source 141, the diffuser plate 151 and the optical film 152 are arranged along the first direction D1. The diffuser plate 151 and the optical film 152 are located between the light source 141 and the display panel 110. The optical film 152 is disposed on the diffuser plate 151. The diffuser plate 151 and the optical film 152 each has at least one edge located in the groove 138 of the housing 130.

In some embodiments, the diffuser plate 151 and the optical film 152 may be fixedly combined via a double sided tape or other suitable adhesives (not depicted). In some embodiments, the adhesive may be provided between the diffuser plate 151 and the optical film 152 and proximate the peripheries of the diffuser plate 151 and the optical film 152. In some embodiments, the diffuser plate 151 is fixedly attached to the housing 130 (e.g., the diffuser plate 151 may be adhered to the housing 130 via an adhesive material).

Figure 3:
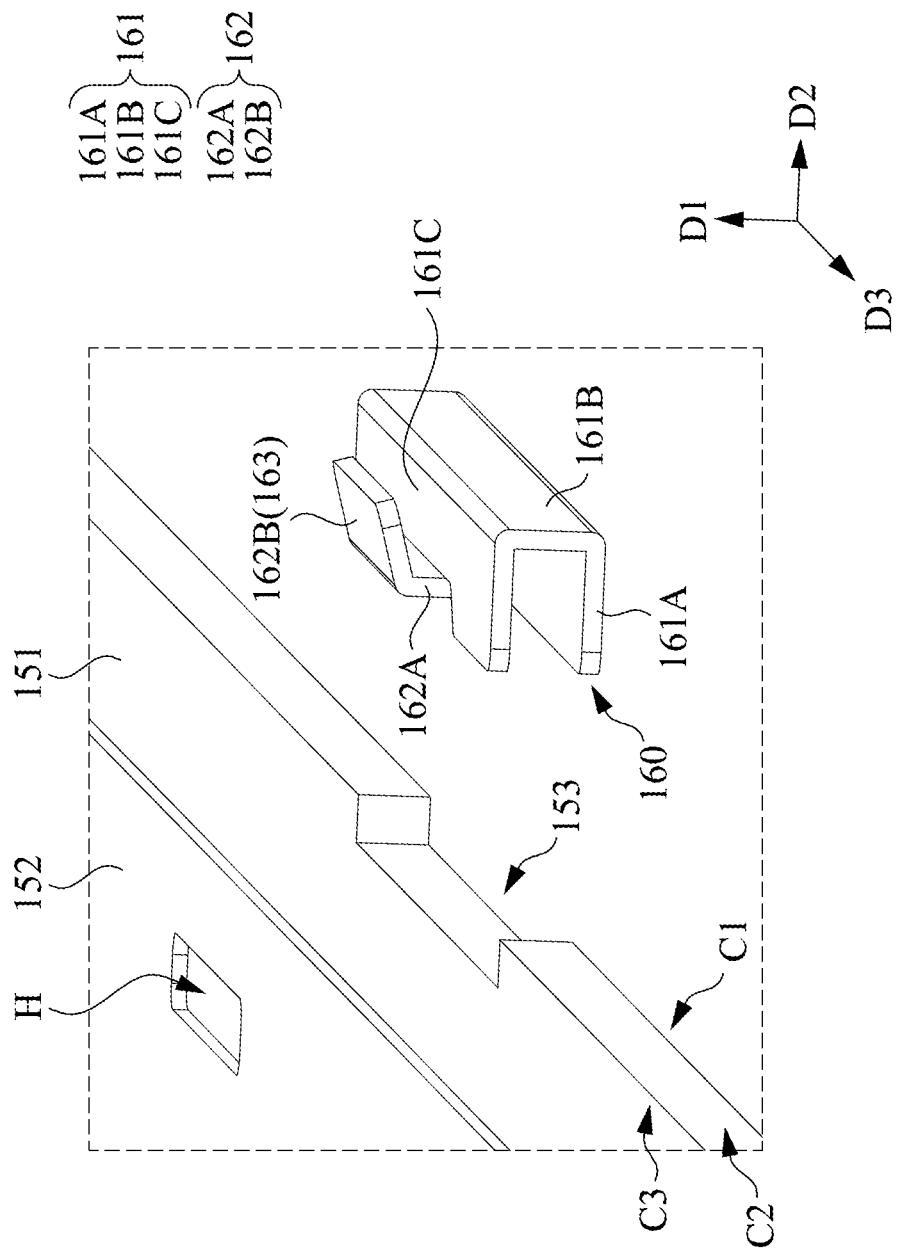
FIG. 3 illustrates an exploded view of some components of the display device shown in FIG. 2.

With reference to FIG. 2 and additionally to FIG. 3, the backlight module 120 further includes at least one holder 160. The holder 160 is disposed in the housing 130 and is configured to strengthen the combination of the diffuser plate 151 and the optical film 152. In some embodiments, the holder 160 is a metallic part and may be formed by means of sheet metal bending. In some embodiments, the holder 160 includes stainless steel or other suitable metal materials.

As shown in FIGS. 2 and 3, specifically, the holder 160 is disposed in the groove 138 of the housing 130 (in other words, the holder 160 is located between the backplate portion 131 and the platform portion 133 of the housing 130) and includes a holding portion 161 and a hanging portion 162 connected to the holding portion 161. The holding portion 161 engages an edge of the diffuser plate 151. The optical film 152 has a thru-hole H. The hanging portion 162 extends through the thru-hole H of the optical film 152.

By this arrangement, the backlight module 120 of the present disclosure can hold the diffuser plate 151 and the optical film 152 in the housing 130 while maintaining the completeness of the appearance of the housing 130. Adding an outer part to the backlight module 120 to improve its appearance and to prevent light leakage, as in conventional backlight modules, would not be necessary. Eliminating the outer part results in simplified structure of the backlight module 120, and can facilitate thin bezel design for the display device 100.

In some embodiments, the holder 160 is disposed on the upper edges of the diffuser plate 151 and the optical film 152, wherein the upper edges refer to the uppermost edges of the diffuser plate 151 and the optical film 152 when the display device 100 is in the upright position (i.e., the position shown in FIG. 1). When in use, the display device 100 is usually kept in the upright position, during which time the holder 160 can support the optical film 152 from the top. As a result, even if the adhesive between the diffuser plate 151 and the optical film 152 fails (e.g., due to temperature or other environmental factors), the holder 160 can maintain the position of the optical film 152 by hanging the optical film 152, such that the optical film 152 remains aligned with the diffuser plate 151.

In some embodiments, the backlight module 120 includes a plurality of holders 160 arranged along the upper edges of the diffuser plate 151 and the optical film 152 (i.e., the holders 160 are arranged along the third direction D3) and spaced apart from one another. The number and the spacing of the holders 160 may be set based on the size of the display device 100 or the display panel 110.

As shown in FIGS. 2 and 3, in some embodiments, the holding portion 161 of the holder 160 fixedly clamps the diffuser plate 151. In some embodiments, the diffuser plate 151 has three surfaces C1, C2 and C3. The surface C3 is opposite to the surface C1. The surface C2 is connected between the surfaces C1 and C3. The holding portion 161 of the holder 160 includes three covering portions 161A, 161B and 161C. The covering portion 161C is opposite to the covering portion 161A. The covering portion 161B is connected between the covering portions 161A and 161C, and the covering portion 161B form a concavity with the covering portions 161A and 161C. The covering portions 161A and 161C contact the surfaces C1 and C3 of the diffuser plate 151 respectively, thereby clamping the diffuser plate 151. In some embodiments, the covering portion 161B of the holding portion 161 contacts the surface C2 of the diffuser plate 151. In some embodiments, the hanging portion 162 is connected to the covering portion 161C and extends in a direction away from the covering portion 161A or the diffuser plate 151.

As shown in FIGS. 2 and 3, in some embodiments, the edge of the diffuser plate 151 has at least one notch 153, and the holding portion 161 of the holder 160 is disposed in the notch 153. By this arrangement, the holder 160 can securely engage with the diffuser plate 151. In some embodiments, the depth of the notch 153 is greater than or equal to a thickness of the holder 160 (e.g., the thickness of the covering portion 161B). By this arrangement, when the holder 160 is combined with the diffuser plate 151, the combined structure would not have any protrusion on its edge.

As shown in FIGS. 2 and 3, in some embodiments, the hanging portion 162 of the holder 160 includes a hook structure 163. The hook structure 163 is located on an end of the hanging portion 162 away from the holding portion 161. The hook structure 163 can prevent the optical film 152 from falling off the hanging portion 162. In some embodiments, the hanging portion 162 includes a first section 162A and a second section 162B. The first section 162A is connected to the holding portion 161. The second section 162B is connected to the first section 162A and is at an angle to the first section 162A.

As shown in FIG. 2, in some embodiments, the sidewall portion 132 extends beyond the platform portion 133 in the first direction D1. By this arrangement, the sidewall portion 132 can serve as the bezel of the display device 100. Since the housing 130 does not include any part that extends to a side of the display panel 110 adjacent to the first surface 111, the user viewing the display device 100 from the front can only see the slim sidewall portion 132 on the outer side of the display panel 110, making the display device 100 visually thin-bezeled.

As shown in FIG. 2, in some embodiments, the platform portion 133 has a surface 134 away from the backplate portion 131, and the sidewall portion 132 has a tip 136 away from the backplate portion 131. In the first direction D1, a distance between the tip 136 of the sidewall portion 132 and the bottom surface B of the backplate portion 131 is greater than a distance between the surface 134 of the platform portion 133 and the bottom surface B of the backplate portion 131. In some embodiments, the sidewall portion 132 includes a bent portion 135 connected to the platform portion 133. The bent portion 135 extends beyond the platform portion 133 in the first direction D1.

As shown in FIG. 2, in some embodiments, the sidewall portion 132 extends beyond the first surface 111 (i.e., the display surface) of the display panel 110 or is flush with the first surface 111 in the first direction D1. In some embodiments, in the first direction D1, the distance between the tip 136 of the sidewall portion 132 and the bottom surface B of the backplate portion 131 is greater than or equal to a distance between the first surface 111 of the display panel 110 and the bottom surface B of the backplate portion 131.

Next, a method for assembling the backlight module 120 will be described with reference to FIGS. 4 to 6. The method for assembling the backlight module 120 includes steps S1-S5.

Figure 4:
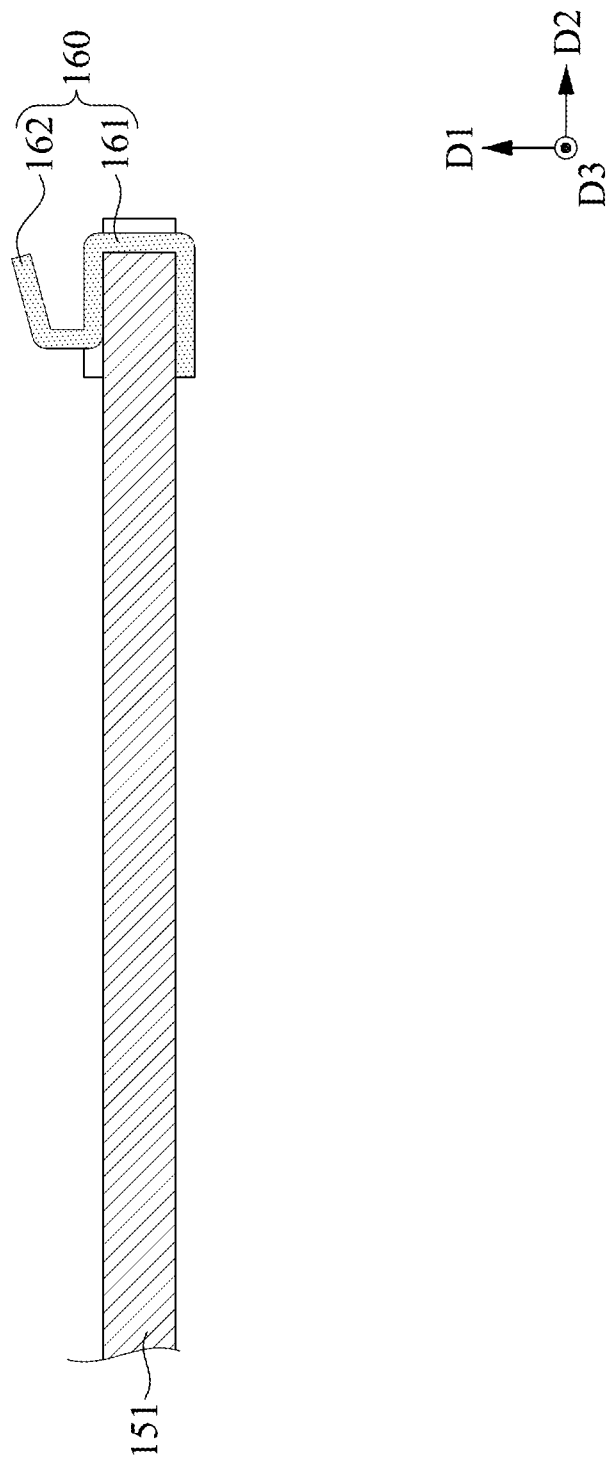
FIGS. 4 to 6 illustrate sectional views of the display device shown in FIG. 2 at various stages of the assembly process.

As shown in FIG. 4, first, in step S1, fixedly engage the holder 160 to an edge of the diffuser plate 151. In some embodiments, step S1 includes: fixedly engaging the holding portion 161 of the holder 160 to the notch 153 on the edge of the diffuser plate 151, such that the holding portion 161 is received in the notch 153.

Figure 5:
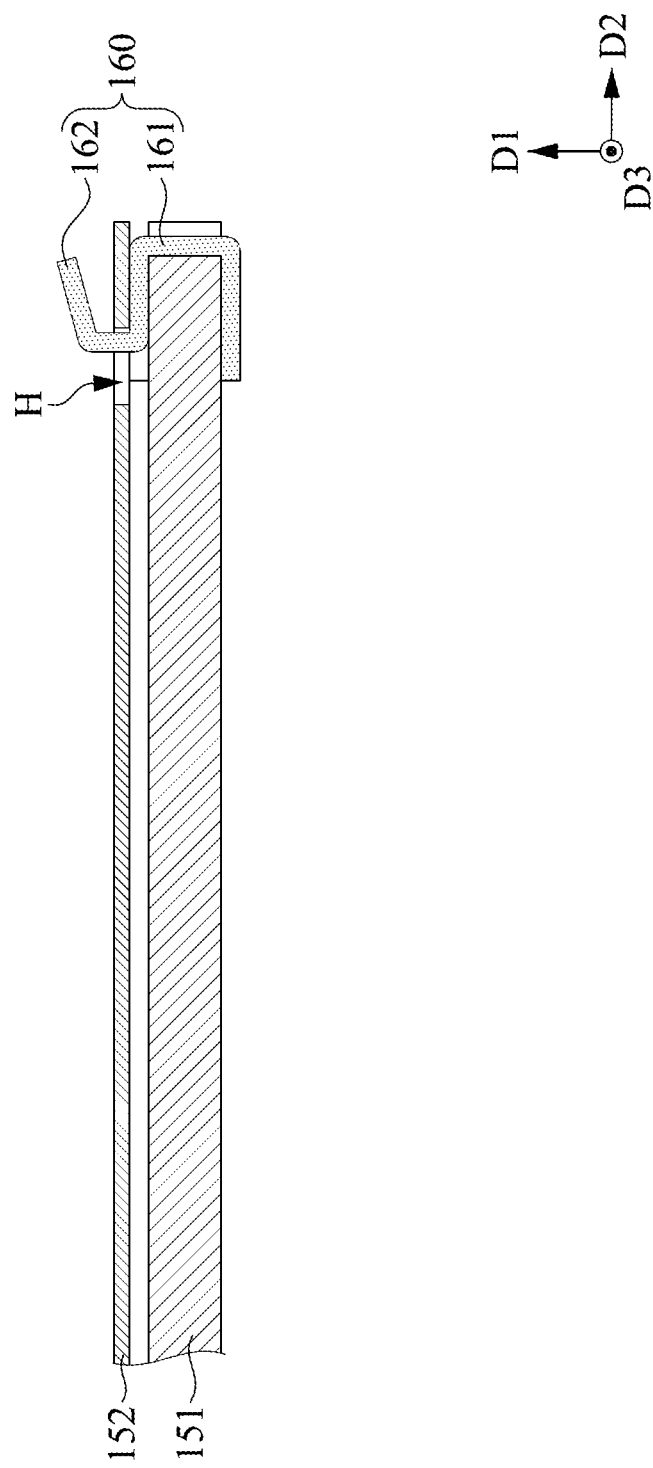

As shown in FIG. 5, next, in step S3, place the optical film 152 over the diffuser plate 151 and fit the optical film 152 onto the hanging portion 162 of the holder 160, such that the holder 160, the diffuser plate 151 and the optical film 152 are combined into a piece. In some embodiments, step S3 includes: passing the hanging portion 162 of the holder 160 through the thru-hole H of the optical film 152. In some embodiments, the method for assembling the backlight module 120 further includes: providing an adhesive between the diffuser plate 151 and the optical film 152, so as to fixedly combine the diffuser plate 151 and the optical film 152.

Figure 6:
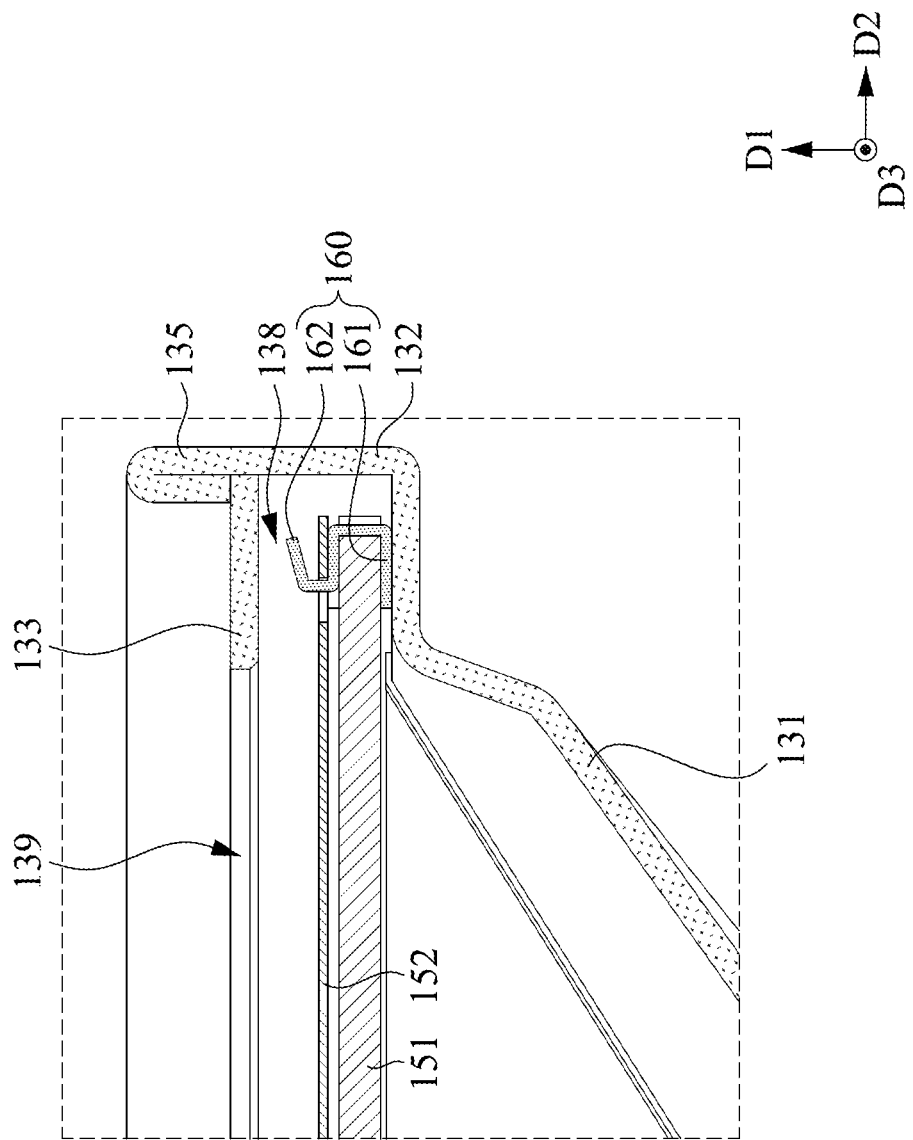

As shown in FIG. 6, last, in step S5, insert the combined piece of the holder 160, the diffuser plate 151 and the optical film 152 into the housing 130, such that the holder 160, the edge of the diffuser plate 151 and an edge of the optical film 152 are received in the groove 138 of the housing 130. In some embodiments, step S5 includes: sliding the combined piece of the holder 160, the diffuser plate 151 and the optical film 152 along the second direction D2 (which is substantially perpendicular to the first direction D1) into the groove 138 of the housing 130. In some embodiments, the method for assembling the backlight module 120 further includes: fixedly attaching the diffuser plate 151 to the housing 130.

Compared to conventional backlight modules, the method for assembling the backlight module 120 of the present disclosure, which includes first combining the diffuser plate 151 and the optical film 152 with the holder 160 and then inserting said three components into the housing 130 together, not only takes less time, but also reduces the risk of the diffuser plate 151 and the optical film 152 being scratched during the assembly process, resulting in improved production efficiency and quality.

In some embodiments, after the assembly of the backlight module 120 has completed, the display panel 110 may be fixedly attached to the platform portion 133 of the housing 130 to complete the assembly of the display device 100.

Figure 7:
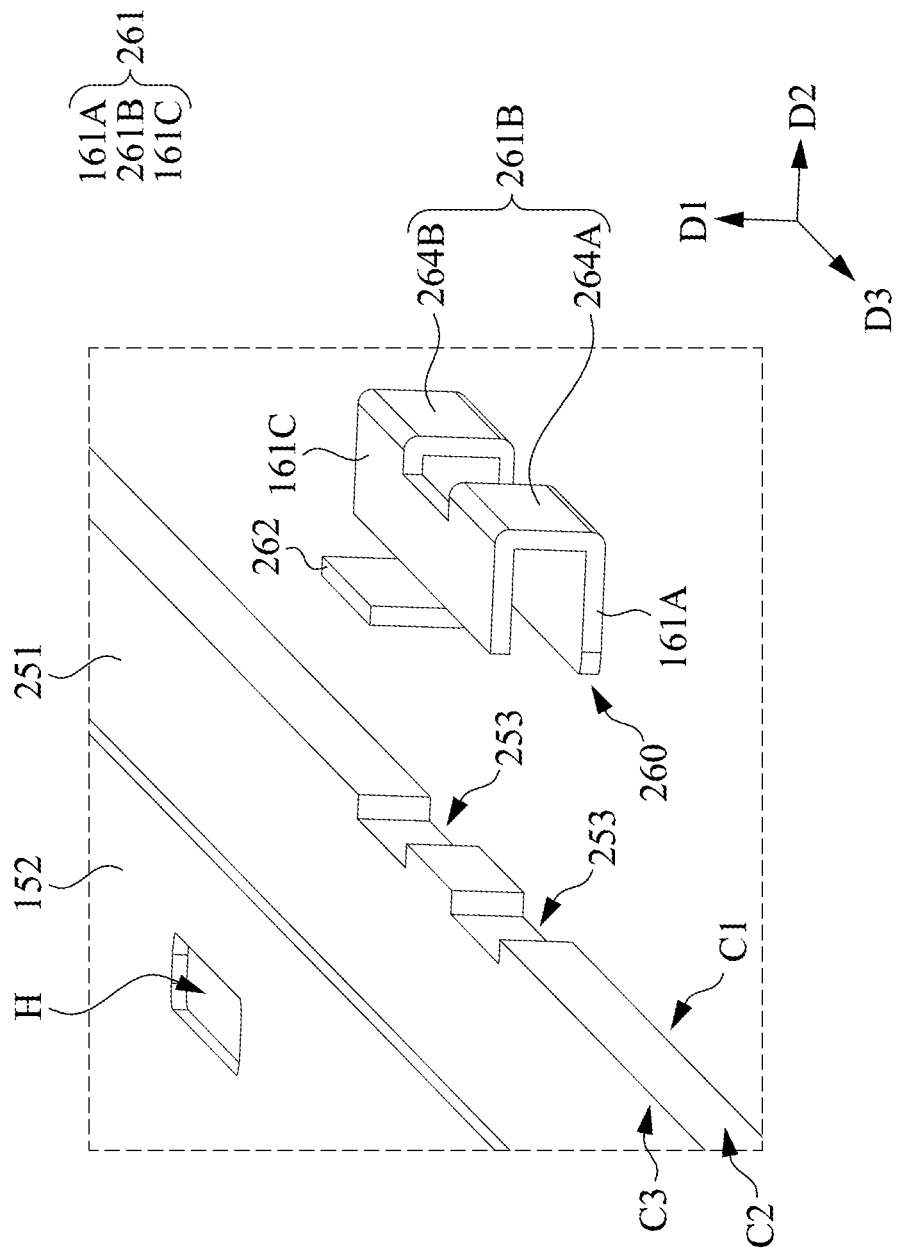
FIG. 7 illustrates an exploded view of a diffuser plate, an optical film and a holder in accordance with another embodiment of the present disclosure.
Figure 8:
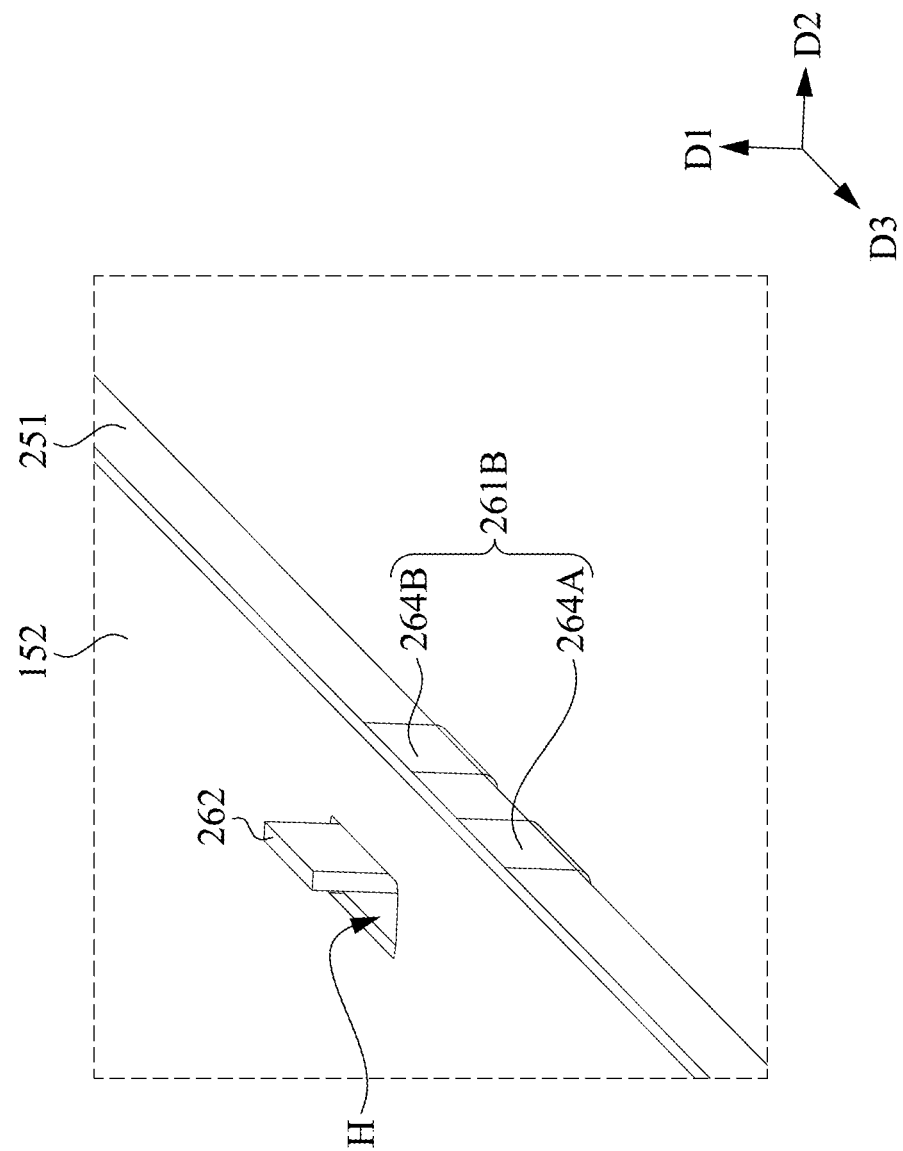
FIG. 8 illustrates an assembled view of the diffuser plate, the optical film and the holder shown in FIG. 7.

Reference is made to FIGS. 7 and 8. In the present embodiment, the covering portion 261B of the holding portion 261 of the holder 260 includes a first section 264A and a second section 264B. The first section 264A and the second section 264B are each connected between the covering portions 161A and 161C. The first section 264A and the second section 264B are spaced apart from each other, such that a void is created between the first section 264A and the second section 264B. The edge of the diffuser plate 251 has two notches 253. The first section 264A and the second section 264B are disposed in the two notches 253 respectively. The relatively protruded portion between the two notches 253 is inserted into the void between the first section 264A and the second section 264B.

As shown in FIGS. 7 and 8, furthermore, the hanging portion 262 of the holder 260 may not be provided with a hook structure. In the present embodiment, the hanging portion 262 includes a straight section connected to the covering portion 161C of the holding portion 261. The hanging portion 262 may be perpendicular to the covering portion 161C or at an angle to the covering portion 161C.

Figure 9:
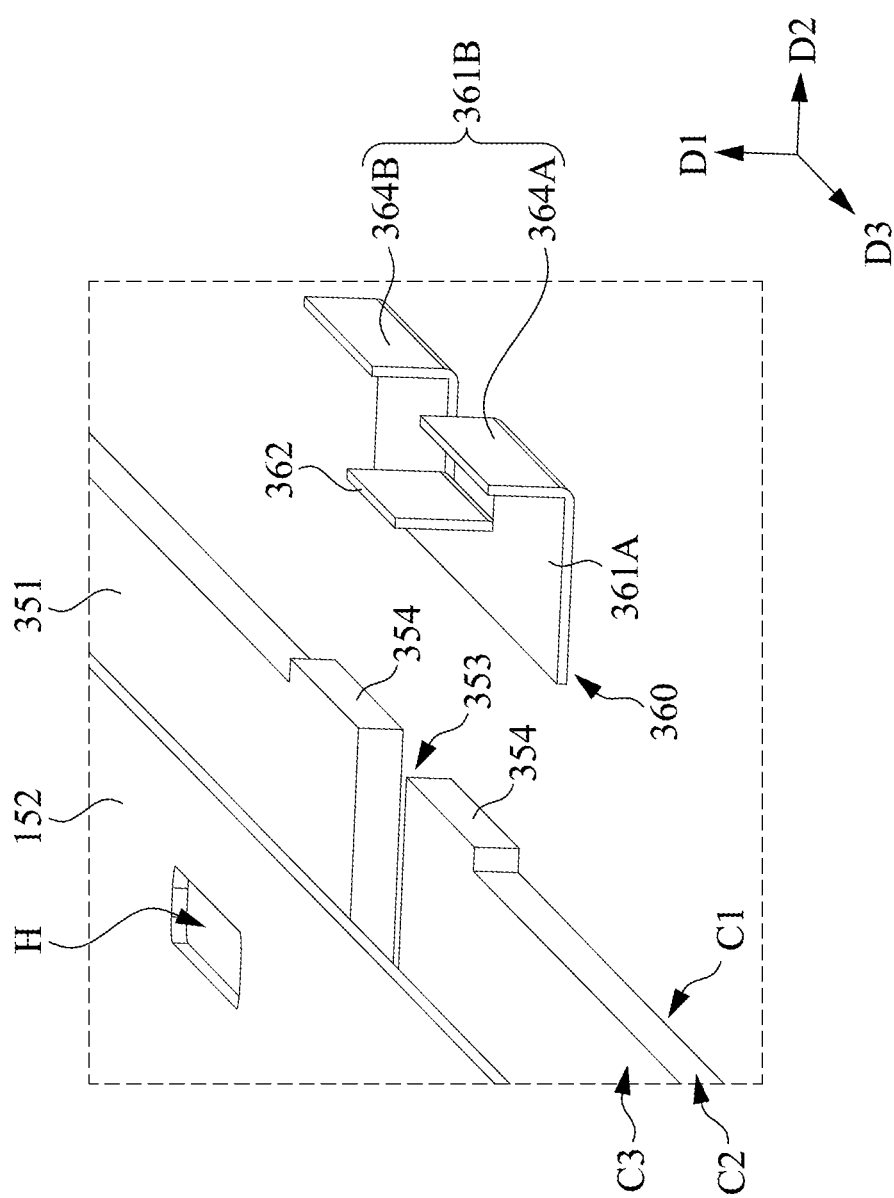
FIG. 9 illustrates an exploded view of a diffuser plate, an optical film and a holder in accordance with another embodiment of the present disclosure.
Figure 10:
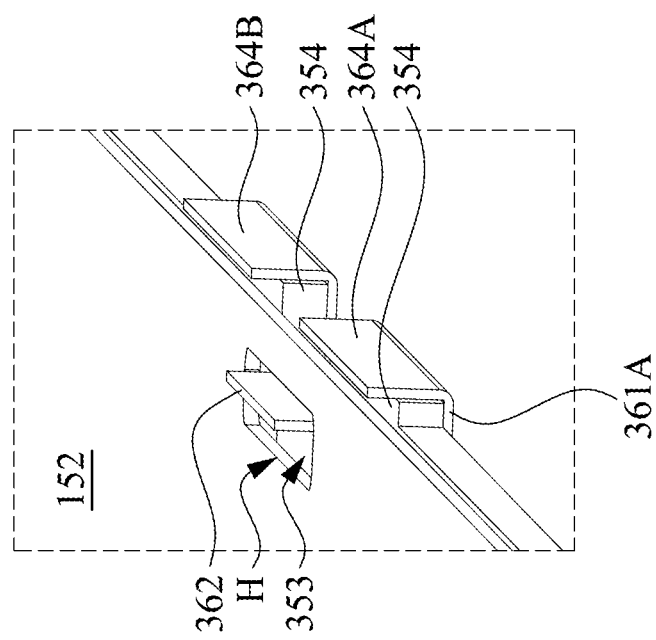
FIG. 10 illustrates an assembled view of the diffuser plate, the optical film and the holder shown in FIG. 9.

Reference is made to FIGS. 9 and 10. In the present embodiment, the holder 360 includes a substantially L-shaped holding portion 361 configured to abut against a corner of the diffuser plate 351. Specifically, the holding portion 361 includes two covering portions 361A and 361B connected to each other. The covering portions 361A and 361B are configured to contact two neighboring surfaces C1 and C2 of the diffuser plate 251, respectively, and are spaced apart from the surface C3 of the diffuser plate 251. The holder 360 of the present embodiment has a simple structure and is thus easy to manufacture (e.g., the sheet metal bending process can be simplified).

As shown in FIGS. 9 and 10, in some embodiments, the hanging portion 362 of the holder 360 is connected to the covering portion 361A. The hanging portion 362 and the covering portion 361B are located on the same side of the covering portion 361A. In other words, the hanging portion 362 and the covering portion 361B extend in the same direction. In some embodiments, when the holder 360 is combined with the diffuser plate 351 and the optical film 152, the covering portion 361A is located on a side of the diffuser plate 351 away from the optical film 152, and the hanging portion 362 extends through the diffuser plate 351 (e.g., via a notch 353 on an edge of the diffuser plate 351) and passes through the thru-hole H of the optical film 152. By this arrangement, the holder 360 can securely engage with the diffuser plate 351.

As shown in FIGS. 9 and 10, in some embodiments, the covering portion 361B includes a first section 364A and a second section 364B spaced apart from the first section 364A. In a direction along which the first section 364A and the second section 364B are arranged, the hanging portion 362 is locate between the first section 364A and the second section 364B of the covering portion 361B. By this arrangement, the holder 360 can stably rest against the diffuser plate 351.

As shown in FIGS. 9 and 10, in some embodiments, the diffuser plate 351 further includes two bosses 354 located on the two sides of the notch 353. The first section 364A and the second section 364B of the covering portion 361B are configured to abut against the two bosses 354, respectively.

In sum, in the backlight module of the present disclosure, the diffuser plate and the optical film are combined by the holder, and the housing of the backlight module is a unitary structure and is formed with a groove. The holder and the edges of the diffuser plate and the optical film can be received in the groove. By this arrangement, the backlight module of the present disclosure can hold the diffuser plate and the optical film in the housing while maintaining the completeness of the appearance of the housing. Adding an outer part to the backlight module to improve its appearance and to prevent light leakage, as in conventional backlight modules, would not be necessary.

Although the present disclosure has been described by way of the exemplary embodiments above, the present disclosure is not to be limited to those embodiments. Any person skilled in the art can make various changes and modifications without departing from the spirit and the scope of the present disclosure. Therefore, the protective scope of the present disclosure shall be the scope of the claims as attached.

What is claimed is:

1. A backlight module, comprising:
   a housing having a groove, the groove being arranged along a periphery of the housing;
   a diffuser plate disposed in the housing, wherein an edge of the diffuser plate is located in the groove of the housing;
   an optical film disposed on the diffuser plate and having a thru-hole;
   a holder disposed in the groove of the housing and comprising a holding portion and a hanging portion, wherein the holding portion engages the edge of the diffuser plate, wherein the hanging portion is connected to the holding portion and extends through the thru-hole of the optical film; and a light source disposed in the housing,
wherein the diffuser plate has a first surface, a second surface and a third surface, the third surface is opposite to the first surface, the second surface is connected between the first surface and the third surface, the holding portion of the holder comprises a first covering portion and a second covering portion connected to the first covering portion, the first covering portion and the second covering portion contact the first surface and the second surface of the diffuser plate respectively, and the holding portion is spaced apart from the third surface of the diffuser plate.

2. The backlight module of claim 1, wherein the edge of the diffuser plate has at least one notch, and the holding portion of the holder is disposed in the notch.

3. The backlight module of claim 1, wherein the hanging portion of the holder is connected to the first covering portion and extends through the diffuser plate.

4. The backlight module of claim 1, wherein the light source, the diffuser plate and the optical film are arranged in a first direction, the housing comprises a platform portion and a sidewall portion, the platform portion is configured to support a display panel, the sidewall portion is connected to the platform portion, and the sidewall portion extends beyond the platform portion in the first direction.

5. A display device, comprising:
a backlight module, comprising:
a housing having a groove, the groove being arranged along a periphery of the housing, wherein the housing comprises a backplate portion, a sidewall portion, and a platform portion that collectively defines the groove, the platform portion is opposite to the backplate portion and has a surface away from the backplate portion, and the sidewall portion is connected to the backplate portion and the platform portion;
a diffuser plate disposed in the housing, wherein an edge of the diffuser plate is located in the groove of the housing;
an optical film disposed on the diffuser plate and having a thru-hole, wherein an edge of the optical film is located in the groove of the housing;
a holder disposed in the groove of the housing and comprising a holding portion and a hanging portion, wherein the holding portion engages the edge of the diffuser plate, wherein the hanging portion is connected to the holding portion and extends through the thru-hole of the optical film; and
a light source disposed in the housing; and
a display panel disposed on the surface of the platform portion of the housing of the backlight module.

6. The display device of claim 5, wherein the light source, the diffuser plate and the optical film of the backlight module are arranged in a first direction, wherein the sidewall portion of the housing extends along a periphery of the display panel, and the sidewall portion extends beyond a display surface of the display panel or is flush with the display surface in the first direction.

7. The backlight module of claim 5, wherein the holding portion of the holder fixedly clamps the diffuser plate.

8. The backlight module of claim 5, wherein the diffuser plate has a first surface and a second surface opposite to the first surface, the holding portion of the holder comprises a first covering portion, a second covering portion and a third covering portion, the first covering portion and the second covering portion contact the first surface and the second surface of the diffuser plate respectively, and the third covering portion is connected between the first covering portion and the second covering portion.

9. The backlight module of claim 5, wherein the hanging portion of the holder comprises a hook structure, and the hook structure is located on an end of the hanging portion away from the holding portion.

10. A method for assembling a backlight module, comprising:
fixedly engaging a holder to an edge of a diffuser plate;
placing an optical film over the diffuser plate and fitting the optical film onto a hanging portion of the holder, such that the holder, the diffuser plate and the optical film are combined into a piece, wherein the hanging portion extends through a thru-hole of the optical film; and
inserting the combined piece of the holder, the diffuser plate and the optical film into a housing, such that the holder and the edge of the diffuser plate are received in a groove of the housing, wherein the groove is arranged along a periphery of the housing, wherein the housing comprises a backplate portion, a sidewall portion, and a platform portion that collectively defines the groove, the platform portion is opposite to the backplate portion and has a surface away from the backplate portion, and the sidewall portion is connected to the backplate portion and the platform portion.

11. The method of claim 10, wherein the diffuser plate and the optical film are arranged in a first direction, and wherein the step of inserting the combined piece of the holder, the diffuser plate and the optical film into the housing comprises:
sliding the combined piece of the holder, the diffuser plate and the optical film along a second direction into the groove, wherein the second direction is substantially perpendicular to the first direction.

12. The method of claim 10, wherein the diffuser plate and the optical film are adjacent to each other.

13. The method of claim 10, wherein the holder further comprises a holding portion, and the holding portion fixedly clamps the diffuser plate.

14. The method of claim 10, wherein the diffuser plate has a first surface and a second surface opposite to the first surface, the holder further comprises a holding portion, the holding portion comprises a first covering portion, a second covering portion and a third covering portion, the first covering portion and the second covering portion contact the first surface and the second surface of the diffuser plate respectively, and the third covering portion is connected between the first covering portion and the second covering portion.

15. The method of claim 10, wherein the hanging portion comprises a hook structure, the holder further comprises a holding portion, and the hook structure is located on an end of the hanging portion away from the holding portion.

16. The method of claim 10, further comprising:
disposing a display panel on the surface of the platform portion away from the backplate portion.

* * * * *